United States Patent [19]

Seulen

[11] 4,377,090

[45] Mar. 22, 1983

[54] THROUGH-FLOW MONITOR FOR LIQUID OR GASEOUS MEDIA

[76] Inventor: Gerhard W. Seulen, 58 Ronsdorferstrasse, 5630 Remscheid, Fed. Rep. of Germany

[21] Appl. No.: 206,985

[22] Filed: Nov. 14, 1980

[30] Foreign Application Priority Data

Nov. 20, 1979 [DE] Fed. Rep. of Germany ....... 2946826

[51] Int. Cl.³ .............................................. G01F 1/28
[52] U.S. Cl. ........................... 73/861.74; 200/81.9 M; 200/82 E; 340/610; 73/861.52
[58] Field of Search .......... 73/861.52, 861.61, 861.71, 73/861.74, 861.53; 116/273; 200/81.9 R, 81.9 M, 82 E; 340/610

[56] References Cited

U.S. PATENT DOCUMENTS

| 828,108 | 8/1906 | Graham ....................... 73/861.55 X |
| 3,119,262 | 1/1964 | Wright et al. .................... 73/861.71 |
| 4,181,835 | 1/1980 | Stadler et al. ..................... 200/82 E |

FOREIGN PATENT DOCUMENTS 1712150 12/1955 Fed. Rep. of Germany .
1943018 4/1970 Fed. Rep. of Germany .
1648026 8/1971 Fed. Rep. of Germany ... 73/861.53
199492 6/1923 United Kingdom ............ 73/861.74
1173550 12/1969 United Kingdom .

*Primary Examiner*—Charles A. Ruehl

[57] ABSTRACT

A through-flow monitor of the type which produces a switching signal as soon as the rate of flow through a duct reaches a particular level consists of a generally tubular housing 1 which can be inserted via screw-threaded or other connections 3, 4 into the flow duct. Inside the housing 1 there is located a shallow diaphragm 5 which is biased by a coil spring 8 into a rest position against an abutment 9. The shallow diaphragm 5 is either of magnetic material or carries a magnetic element and is displaced in the downstream direction by the flow through the housing. A switch device such as a reed switch or Hall generator is located outside of the duct and is switched in as soon as the diaphragm moves to a predetermined position within the duct representative of a particular rate of flow therethrough. A variety of different embodiments are shown featuring apertured and non-apertured diaphragms and illustrating a wide range of modifications which can be used with advantage to monitor the flow of both gaseous and liquid media.

18 Claims, 9 Drawing Figures

THROUGH-FLOW MONITOR FOR LIQUID OR GASEOUS MEDIA

FIELD OF THE INVENTION

The invention relates to a through-flow monitor for liquid or gaseous media and has particular reference to a monitor comprising a housing which is insertable into a flow duct for the medium in question, a signalling device which is arranged in the housing and displaceable, in dependence on the flow, against the force of a bias spring away from a rest position in which it is biased against an abutment and at least one evaluation device which is arranged outside of the flow chamber defined by the housing and which can be actuated by the movement of the signalling device.

Through-flow monitors of the above kind are frequently used to produce a switching signal as soon as a particular predetermined rate of flow of the medium is achieved.

BRIEF DESCRIPTION OF THE PRIOR ART

Various through-flow monitors of the above described kind are known but are generally unsatisfactory for a number of reasons which can be largely attributed to the shape and manner of suspension of the signalling device.

Many of the known signalling devices are unsatisfactory because they tend to tilt or jam within the housing as a result of the turbulent flow conditions which necessarily leads to unsatisfactory operation. Other signalling devices are constructed in such a way that impurities present in the media tend to accumulate in the monitor leading eventually to a disturbing pressure loss in the apparatus. This latter effect is particularly critical when carrying out measurements on heavily contaminated media or media which have considerable quantities of additives of materials such as graphite or colloidal substances.

Furthermore, it has been shown that apparatus for monitoring the through-flow of viscous media, such as hydraulic oil or lubricating oils, tend to produce unreliable switching signals because viscosity fluctuations result in unavoidable variations of the wall friction between the flowing medium and the external contours of the signalling device. As this friction clearly plays an important roll in determining the extent of movement of the signalling device against the bias spring it will be readily appreciated that fluctuations in this friction force are very undesirable.

To illustrate this point it is instructive to consider the case of a through-flow monitor which is set to produce a switching signal at a flow of 15 l/min of an oil having a specific viscosity of say 16°E at an operating temperature of approximately 50° C. During warming up of a plant in which this through-flow monitor is embodied it can reasonably be expected that the operating temperature will be considerably lower and can lie in the range from 10° to 20° C. This will result in a considerably reduced switching point which, in the selected example, can be reached at a flow of from 3 to 4 l/min because the viscosity of the same oil can easily have increased, depending on its quality, to 100° to 200°E. The same applies in the other direction when the temperature of the oil goes beyond the normal operating temperature of 50° C. with the result that the viscosity is correspondingly reduced. In this case the switching point moves upwardly to larger rates of flow which shows that the operational reliability of the through-flow monitor is far from adequate.

OBJECTS OF THE INVENTION

The principal object of the present invention is to construct a through-flow monitor of the initially named basic kind in such a way that the disadvantages of the known devices are avoided.

It is a particular object of the present invention to provide a through-flow monitor which operates entirely satisfactorily even when using highly contaminated flow media or flow media with a high proportion of particulate or colloidal additives.

It is a further object of the present invention to provide a through-flow monitor which is not subject to tilting or jamming of the signalling device.

A further and important object of the present invention is also to provide a through-flow monitor which operates satisfactorily even when the viscosity of the flowing medium can vary over a large range.

Additionally, it is an object of the present invention to provide a through-flow monitor which has significantly better characteristics than previously known devices with regard to the hysteresis between the switching in and switching out points and also with regard to pressure loss at high flow rates.

BRIEF DESCRIPTION OF THE INVENTION

The above objects are satisfied by a through-flow monitor of the above described general kind in which the movably supported signalling device takes the form of a shallow diaphragm which is freely movably fastened to the end of a compression spring and is centrally guided in the flow chamber by the compression spring while forming a substantially constant gap with the wall of the flow chamber.

As a result of this arrangement, and the use of a resiliently supported shallow diaphragm the dimensions of which in the axial direction only amount to a fraction of its diameter, an arrangement of surprisingly simple construction is obtained which brings ideal results and operates reliably under the most various and critical conditions.

The gap between the inner wall of the flow chamber and the shallow diaphragm is preferably shaped to stabilize the position of the flat diaphragm. In this connection the outer peripheral wall of the flat diaphragm preferably diverges conically in the flow direction of the medium.

If required the flat diaphragm can be provided with at least one central aperture.

In an arrangement of this kind the medium to be monitored principally flows through the aperture in the diaphragm and a high differential pressure which is significantly larger than the pressure loss across the diaphragm is created at the outer periphery of the diaphragm. This high differential pressure at the outer periphery ensures that the movable diaphragm is held centrally in the flow chamber. This tendency towards a central position of the flat diaphragm is assisted by the slightly conical construction of its outer peripheral wall.

It is also of advantage to use an aperture in the diaphragm which is conically divergent over at least a part of its axial length in the flow direction of the medium.

If additional stabilization of the flat diaphragm is necessary at high flow velocities the conical peripheral wall of the diaphragm can be somewhat enlarged in the axial direction. This can be achieved by the use of a peripheral shoulder.

In accordance with a further advantageous embodiment of the invention the upstream wall of the shallow diaphragm has a shallow funnel like shape which converges in the direction towards the aperture. This arrangement ensures that additives, foreign bodies or suspended particles are necessarily led to the aperture and thus immediately removed from the vicinity of the shallow diaphragm.

In accordance with a particularly advantageous form of the invention the shallow diaphragm consists of an annular part and a diaphragm part with a defined aperture which can be fixed into the annular part. By using different diaphragm parts it is then possible to adapt the apparatus to the prevailing operating conditions in a particularly simple manner.

The instantaneous position of the signalling device i.e. of the shallow diaphragm can in principle be determined or detected in various ways from outside the housing. The position of the shallow diaphragm can for example be detected by optical-electronic means when using a transparent housing.

It is however preferred, in accordance with the invention, to use a shallow diaphragm which either consists, at least in part, of magnetic material or carries one or more permanent magnetic elements. The position of a shallow diaphragm of this kind can be detected by an evaluation device taking the form, by way of example, of a Hall generator one or more reed switches, a magnetically actuated snap switch or the like.

The shallow diaphragm preferably consists of magnetic rubber which is manufactured, for example, from a mixture of rubber or buna with barium-ferrite-powder in a vulcanizing process and is subsequently magnetised in the desired manner, for example in the axial direction.

The bias spring used in the flow monitor in accordance with the invention preferably consists of a coil spring one end of which is held on a support surface of the housing and the other end of which is fixed in the region of the outer periphery of the shallow diaphragm. Each of the spring ends is usefully attached in such a way that rotational movements are reliably precluded.

A particularly favoured construction is achieved if the abutments or support surfaces for the coil spring and the flat diaphragm are realized in the form of support rings which can be screw-threaded into internal threads in the housing which simultaneously form the connection threads for the ducts carrying the flowing medium. In the event that it is desired to monitor media in a high temperature range, for example from 100° C. to 400° C., it is advantageous to mount the evaluation device or switching head with an air gap between it and the housing. As a result of this arrangement the required accuracy of switching is maintained while the automatically occurring thermosyphon-effect results in automatic cooling of the switching head which makes it possible, for example with a temperature of the medium of 300° C. and an ambient temperature of approximately 25° C., to keep the switching head at a temperature of approximately 70° C. This ensures that neither reed switches nor Hall generators suffer from temperature dependent damage.

One particularly advantageous embodiment of the invention features a housing with a flow chamber the cross-section of which is enlarged relative to the nominal size of the duct in which the monitor is to be fitted.

In an arrangement of this kind the shallow diaphragm can readily be fashioned without a central aperture so that the flow through the monitor takes place entirely in the gap between the diaphragm and the housing. The diameter of the shallow diaphragm can however be close to that of the diameter of the enlarged cross-section of the housing and still ensure a sufficient flow cross-section.

In a particularly preferred embodiment the ratio of the diameter of the enlarged cross-section of the housing to the nominal diameter of the housing lies in the range from 1.5 to 10.

The ratio of the diameter of the coil spring to its length when the shallow diaphragm is in its rest position biased against the abutment preferably lies in the range from 0.6 to 8.5. As the nominal size increases and thus the diameter of the shallow diaphragm the aforementioned ratio preferably increases substantially as the square root of the ratio of the nominal size to the increase in cross-section of the housing.

As a general rule the radial width of the annular gap between the shallow diaphragm and the wall of the housing is usefully selected to lie in the range from 1 to 6 mm in dependence on the throughput.

SPECIFIC DESCRIPTION OF PREFERRED EMBODIMENTS

The invention will now be described in further detail by way of example only and with reference to a number of embodiments as illustrated in the drawings which show.

Figure 1:
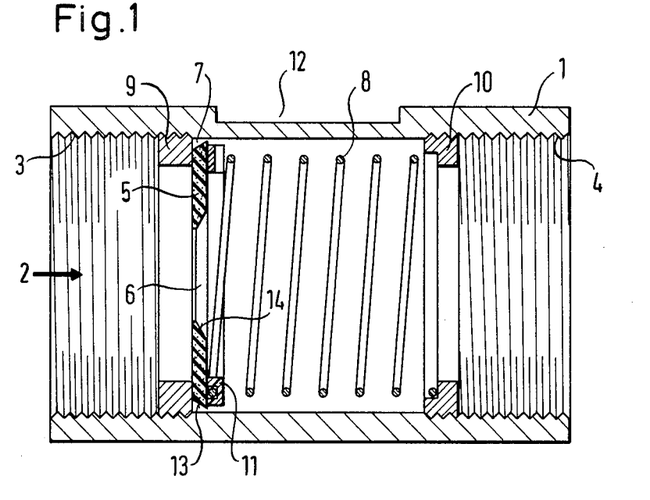
FIG. 1 a schematic longitudinal section through a first embodiment of a through-flow monitor, FIG. 2 a schematic longitudinal view of a variant of the embodiment of FIG. 1, FIGS. 3 and 4 schematic longitudinal sections of further embodiments of through-flow monitors, FIG. 5 a sectional view of a variable diaphragm for use in flow monitors in accordance with the invention, FIG. 6 a longitudinal section through a further embodiment of a flow monitor, FIG. 7 a sectional view of a particularly simple form of a diaphragm for use in the flow monitors in accordance with the invention, FIG. 8 a schematic sectional view of an embodiment of the invention with an alternative shape of housing, FIG. 9 a cross-sectional view of a yet further embodiment of a through-flow monitor having a housing of increased cross-sectional area.

Turning now to the drawing of FIG. 1 there can be seen a through-flow monitor which is of particularly simple construction and is thus inexpensive to manufacture. The through-flow monitor includes a tube-like housing 1 (which can be externally hexagonal) of a non-magnetic material such as aluminum, bronze, brass, stainless steel, plastic or the like through which a liquid or gaseous medium is flowed in the direction of the arrow 2. Internal threads 3 and 4 are provided at the inlet and outlet sides of the housing to allow it to be connected into a conduit or other flow duct. A shallow diaphragm 5 with a central aperture 6 is located in the housing 1. This shallow diaphragm 5 lies in its rest position against a ring-like abutment 9 which is screwed into the internal thread 3 and accurately positioned.

A helical spring 8, which is braced against a ring abutment 10 screw-threaded into the internal thread 4 at the outlet side, presses the shallow diaphragm 5 against the ring abutment 9. In order to ensure that the spring 8 is held reliably, and also prevented from rotating, the end of the spring can be bent through 90° and inserted into a bore (not shown) in the support ring 10. In this way the spring is located axially within the housing. To connect the spring 8 with the movable shallow diaphragm 5 it is possible to use fastening elements of the kind used to secure wire-like parts to surfaces, for example crimped eyelets.

In the embodiment of FIG. 1 the spring is held in the region of the outer periphery of the shallow diaphragm 5 by means of a ring 11 of plastic or metal. The ring is milled away at one point of its periphery in order to allow it to be threaded onto the last winding of the helical spring. The particular ring 11 shown in the drawing is provided with an annular ring groove in its side into which the spring is threaded. The ring 11 is rigidly connected with the flat diaphragm 5 by means of screwed fasteners, rivets or by glueing; the method of connection is however not shown in the drawing.

The shallow diaphragm 5 usefully consists of a magnetic rubber material which is magnetized in the axial direction. The shallow diaphragm 5 which has a fractionally smaller diameter than the diameter of the cylindrical flow chamber in which it lies has a centrally disposed aperture 6 and a peripheral edge which is conically divergent in the flow direction. This shape of the peripheral surface of the shallow diaphragm 5 assists in operation in achieving a particularly good centering of the shallow diaphragm and in preventing any eventual flutter effects. The annular gap 7 between the shallow diaphragm 5 and the inner wall of the housing is very small so that a high differential pressure is created which is significantly larger than the pressure drop across the aperture. This high differential pressure at the external periphery also assists in ensuring that the movable shallow diaphragm is centrally supported and that no falsification of the measurement or of the switching point occurs even when the flow monitor is mounted horizontally.

A cut-out 12 is provided in the outer side of the housing in the illustrated embodiment of FIG. 1 to accommodate an evaluation or switching device. This evaluation or switching device, which can take the form of a reed switch, a Hall generator or the like, is usefully attached in such a way that it is axially adjustable.

It can be seen that the through-flow monitor of FIG. 1 is of extremely simple construction and requires a minimum of individual components which can be accurately and quickly assembled without difficulty. Despite its simple construction this through-flow monitor is highly reliable in operation, accurate and suitable for a wide range of applications.

Figure 2:
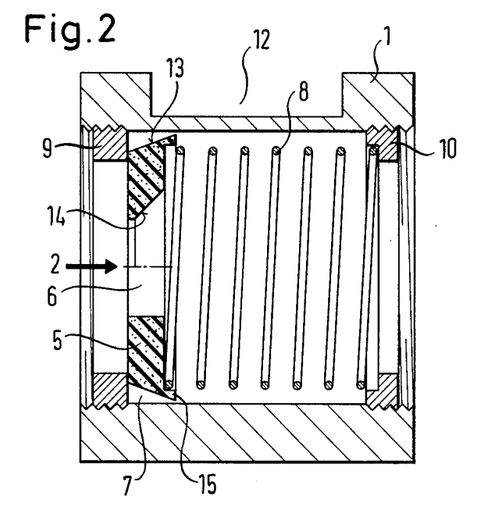

The variant of FIG. 2 is distinguished from the embodiment of FIG. 1 essentially only in that the housing 1 is intended to be clamped in a sandwich construction between two flanges with throughgoing bolts from flange to flange. The movable shallow diaphragm 5 of this embodiment has a longer conical region 13 at its outer periphery in order to ensure additional stability of the diaphragm 5 even with media flowing at higher speeds of for example 10 m/sec and more. This feature of the shallow diaphragm is particularly useful.

In this embodiment it is also useful to manufacture the diaphragm 5 in magnetic rubber which can be machined particularly well by chip forming and grinding processes. The conical extension can thus be realized without difficulty in the form of an annular projection 15 which can simultaneously be utilized to hold the helical spring 8. The diaphragm aperture 6 can also be provided with an advantageous shape without difficulty. In this connection the upper half of FIG. 2 shows a central aperture 6 with a peripheral wall 14 inclined to the axis, i.e. a conically divergent aperture 6. For flow monitors for use with conduits or flow ducts of large nominal sizes it is advantageous to manufacture the shallow diaphragm 5 from non-magnetic sheet metal or plastic with a small wall thickness and then merely to provide it with a relatively thin magnetic ring or a magnetic ring section in the vicinity of the evaluation device.

Turning now to the embodiment shown in FIG. 3 there is once again illustrated a through-flow monitor in which flow takes place in a straight line through the housing 1. An evaluation or switching device 24 is attached to the outer surface of the housing 1 and takes the form of a device incorporating a reed switch 25. The switch element is usefully secured in the lower part of a plug connection by means of silicon rubber or a similar insulating material which is cast around the switch element. The assembly together with the plug connection is then screwed to the surface of the housing.

Figure 3:
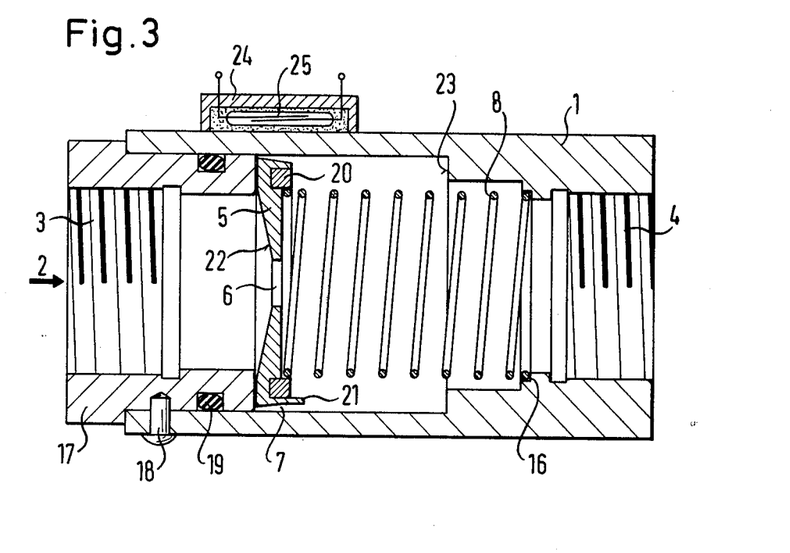

An inlet member 17 with an internal thread 3 is let into the housing 1 and is sealed by means of an O-ring 19 and secured by one or more drive fit pins 18. The inlet member 17 can in principle be secured in the housing in a variety of ways.

The inlet member 17 simultaneously forms an abutment for the shallow diaphragm 5 which is equipped with an annular magnet 20 which is glued into a groove in the shallow diaphragm 5 at a small distance from the outer peripheral edge thereof. If required the annular magnet can be additionally held by the coil spring 8. The coil spring 8 is braced and firmly clamped against an annular abutment 16 in the downstream region of the housing. The spring presses the shallow diaphragm 5 with a predetermined bias against the inlet member 17 and holds the shallow diaphragm 5 in a central position so that practically no contact occurs between the shallow diaphragm 5 and the inner wall of the housing 1.

The shallow diaphragm 5 has the form of a shallow funnel 22 centered on the diaphragm aperture 6 at its inlet side. This shape ensures that additives, foreign bodies, suspended particles and the like can flow away freely via the central aperture 6.

In the downstream region of the housing 1 there is provided an annular shoulder 23 which the shallow diaphragm 5 contacts when the maximum flow rate is achieved in order to avoid the spring 8 being overloaded which would be undesirable. In order to ensure that the medium can flow unhindererd through the annular gap 7 between the shallow diaphragm and the inner wall of the housing, even when the spring is fully compressed and the shallow diaphragm contacts the shoulder 23, the shallow diaphragm has a plurality of projections or spacer elements in its peripheral region.

Figure 4:
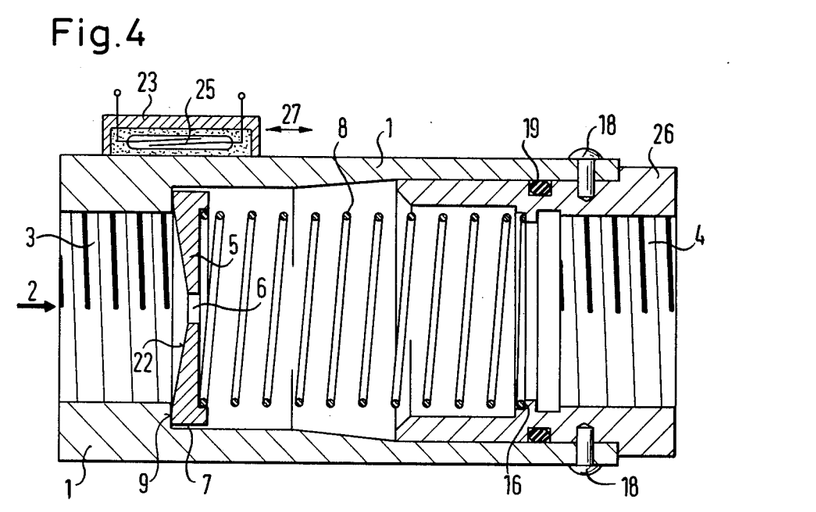

An outlet flow member 26 is provided in the embodiment of FIG. 4 in place of the inlet flow member used with the variant of FIG. 3. The outlet flow member is once again sealed relative to the housing by means of an O-ring and secured by press fit pins 18. The end of the coil spring 8 remote from the shallow diaphragm is secured to the outlet flow member 26 at a support abutment 16.

The shallow diaphragm 5 is constructed as a permanent magnet consisting of barium ferrite or alnico (an aluminum nickel-cobalt alloy) and is clamped onto the end coil of the coil spring 8.

The switch device 23 which is actuated by the permanent magnetic shallow diaphragm 5 is preferably attached to the housing 1 for displacement in the direction of the arrow 7. In this way it is possible to adjust the switching point in operation or to regulate the switching point in dependence on the prevailing operating conditions.

The switching point, i.e. the rate of flow which the through-flow monitor is set to detect can be adjusted and matched to the prevailing operating conditions by varying the diameter of the central aperture 6 in the shallow diaphragm 5. An increase in the diameter of the aperture produces a displacement of the switching point to higher rates of flow.

When using shallow diaphragms of magnetic material such as barium-ferrite, alnico or the like it is useful to form this material into an annular shape and to provide it with a central insert of plastic or metal having a central aperture 6 with the required size for the prevailing operating conditions.

Figures 5, 6, 7, 8:
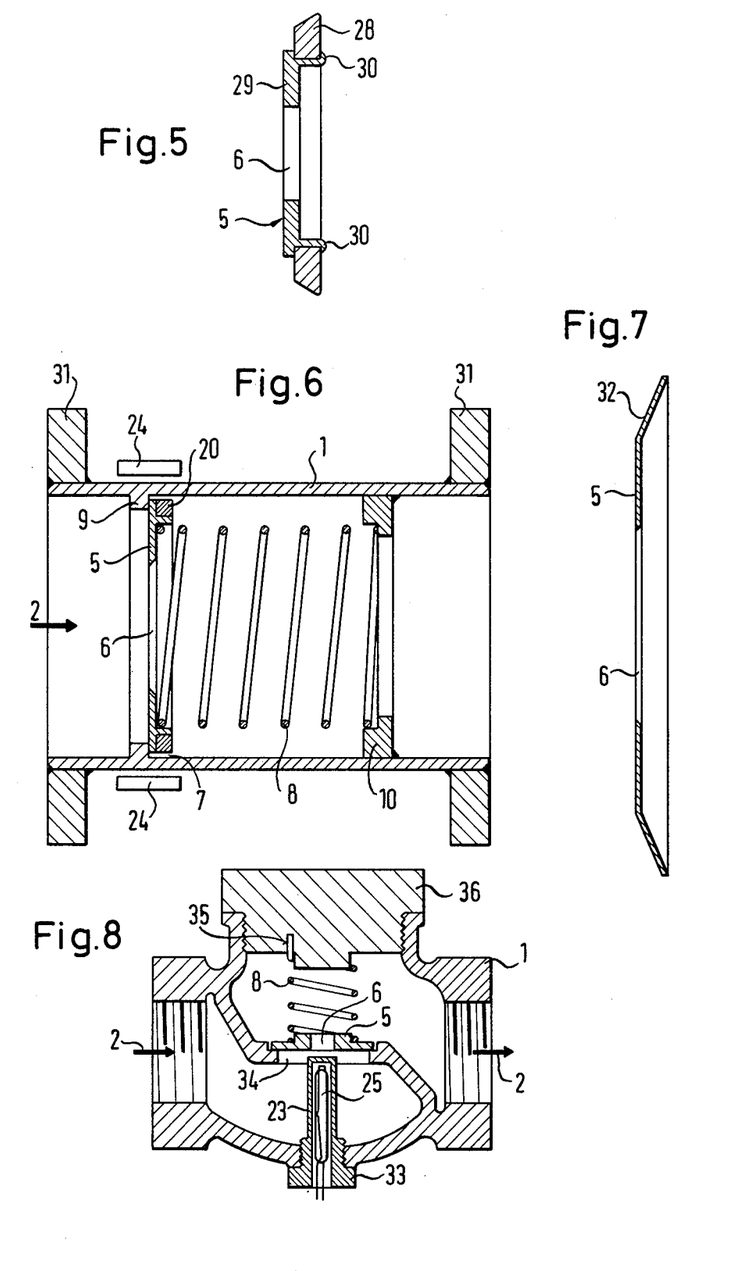

FIG. 5 shows an embodiment of this kind using a shallow diaphragm 5 consisting of an annular magnetic element 28 with an insert 29 which is connectible with the annular elements 28, for example by means of a resilient snap connection 30. The use of such inserts 29 makes it extremely easy to match the through-flow monitor to the desired operating conditions because the inserts 29 can be inserted without difficulty and secured simply by the use of a snap action fitting.

FIG. 6 shows an embodiment of the invention which is particularly useful for large nominal duct sizes and which is particularly simple and inexpensive to manufacture. The housing consists of a tubular body of non-magnetic material such as austensic steel, copper, aluminium, brass or plastic material with flanges 31 at its ends. Depending on the material and the loads involved these flanges can be fitted by welding, brazing, soldering or by the use of adhesive. The bolt holes in the flanges are not visible in the illustrated section. In place of these flanges it is naturally also possible to provide internal threads, external threads, weld grooves or the like.

The shallow diaphragm 5 with its central aperture 6 lies against an internal abutment 9 of the tubular housing and is pressed against this internal abutment by means of a helical spring 8 which is braced against and secured to a further annular abutment 10. This further annular abutment 10 can readily be secured to the housing by welds or the like.

The shallow diaphragm 5 carries an annular magnet 20 which consists, by way of example, of magnetic rubber or magnetic plastic. The abutment for the shallow diaphragm 5 in the flow direction can be omitted, as in the illustrated embodiment, if the spring 8 is so arranged that even at the largest rates of flow the differential pressure across the diaphragm is not sufficient to overstress the spring or result in coil binding thereof.

The switching device 24 arranged at the side of the tubular housing 1 and which is only illustrated schematically in FIG. 6 can one again be formed as a Hall generator, a reed switch, a magnetic snap switch or the like. The switching device can be arranged both above or below the tubular housing 1. The arrangement below the housing is preferred when the apparatus is horizontally mounted and the flow media are at high temperatures.

A preferred embodiment of a shallow diaphragm which can also be used in the embodiment of FIG. 6, is shown in FIG. 7. In this embodiment the marginal zone 32 of the shallow diaphragm is angled with respect to its central portion which results in a stabilizing and centering effect on the diaphragm. This is of particular importance when monitoring the flow of gaseous media. The thickness of the shallow diaphragm is preferably small relative to the diameter of the diaphragm. The following guide line applies:

$$T < 0.05 D$$

where T is the thickness of the shallow diaphragm and D the diameter thereof.

In place of the annular magnet 20 shown in FIG. 6 one can also use a permanent magnet of segmental, bar or cubical form providing measures are taken to ensure that the relative position of the permanent magnet and the switching device or evaluation circuit are maintained during operation.

FIG. 8 shows an embodiment of the invention using a housing 1 adapted to be mounted on a flat surface. This housing which can be manufactured in red brass, is provided with internal threads at its inlet and outlet sides and has a shallow diaphragm 5 with a central aperture 6 which is manufactured in a magnetic material and magnetized in the axial direction. This shallow diaphragm 5 is once again held by means of a coil spring 8 which is clamped into a cover part 36. The coil spring 8 has one end bent over so that it fits into a bore 35 in the cover. This arrangement, in combination with the short cylindrical spigot which is formed on the cover 36 and which fits inside the coil spring 8, ensures that the spring is reliably seated and cannot turn. A reed switch 25 is located within a tube 23 which forms part of a screw-threaded plug 33 which can be inserted in a sealed manner into the base of the housing. The medium to be monitored flows in the direction of the arrow 2 and lifts the shallow diaphragm as a result of the pressure differential which occurs in the transverse wall region. As a result of this differential pressure the shallow diaphragm 5 lifts from its seat 34 on the transverse wall 37 which results in the reed switch, which is closed in the rest position, opening again as soon as the diaphragm has moved a specific distance from the reed switch. It is readily possible to reverse the switching off signal of the reed switch to a switching on signal by using an additional change over switch.

The internal diameter of the diaphragm seat 34, the external diameter of the shallow diaphragm 5, the characteristic of the spring 8 and the size of the central aperture 6 determine the switching point of the monitor which is also influenced by the position of the reed switch 25. If the reed switch is positioned further down. In the tube 23 then the apparatus switches at smaller rates of flow whereas, on moving the reed switch in the opposite direction, the rate of flow at which switching occurs increases.

The tube 23 together with the reed switch 25 could also be inserted through the cover 36 in a pressure tight manner. In an embodiment of this kind it would be useful to make the aperture 6 sufficiently large that the tube 23 can project downwardly through the aperture. In this way it can also be ensured that the reed switch 25 is used in the normal mode in which it switches in as the flow increases and out as the flow decreases.

Figure 9:
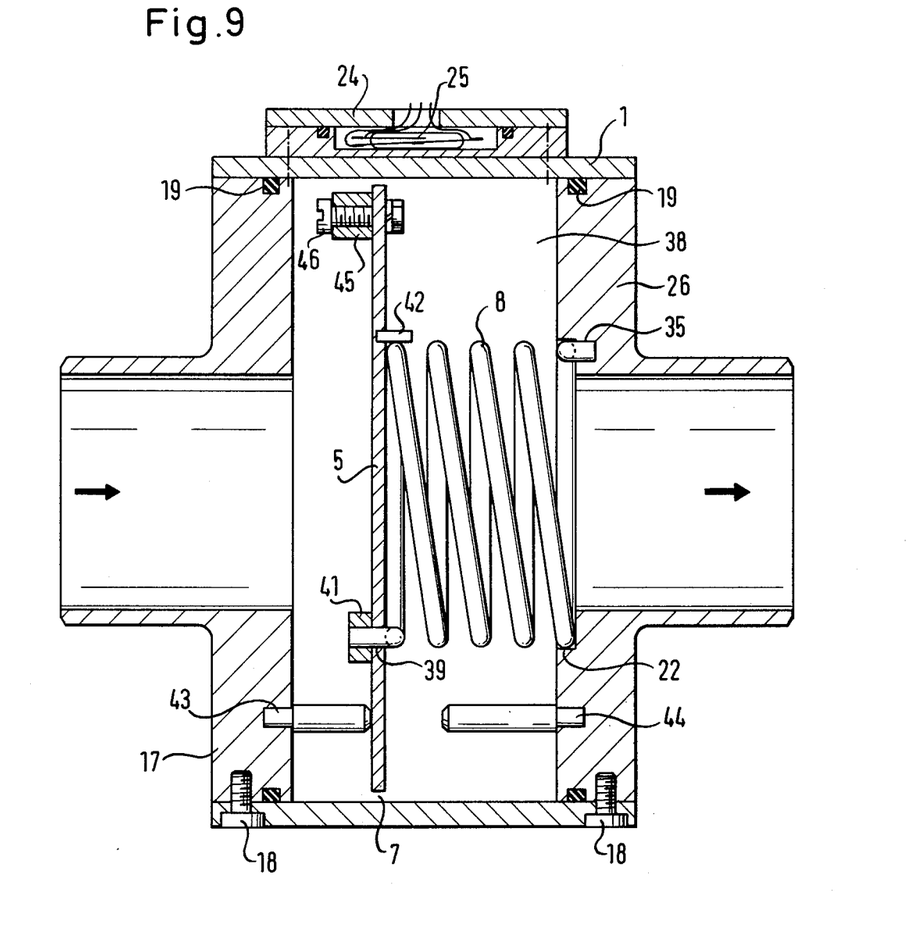

Turning finally to FIG. 9 there is shown an especially preferred embodiment which offers a number of additional advantages. The general layout of the through-flow monitor of FIG. 9 is similar to that of earlier embodiments and the same reference numerals will be used to designate elements having counterparts in the previously described arrangements.

It will firstly be noticed that the housing 1 has flow chamber 38 which is again of cylindrical form but of considerably increased diameter relative to the inlet and outlet members 17 and 20. The outer wall of the housing is a simple section of tube which fits over the inlet and outlet members 17, 26 and is sealed relative thereto by means of O-rings 19. Set screws or press fit pins 18 pass at a number of locations around the periphery of the tube radially into the inlet and outlet members 17, 26. Three equispaced set screws or pins 18 are normally sufficient to reliably secure the tube section to the inlet and outlet members 17, 26. A shallow diaphragm 5 is once again located within the flow chamber 38 but differs from the earlier shallow diaphragm by virtue of the fact that no central aperture is provided. Instead the required flow area is provided by the annular gap 7 between the peripheral edge of the shallow diaphragm 5 and the tubular wall of the housing 1. The increased cross section of the housing enables the radial depth of the annular gap 7 to be held relatively small so that the functioning of the device is maintained without presenting an undue blockage to the flow therethrough. The shallow diaphragm 5 is once again supported on a coil spring 8 in such a manner that it is always concentrically positioned within the housing. In particular it will be noted that the coil spring once again has bent over tags at its two ends one of which engages in a bore 35 in the outlet member 26 and the other of which engages in a bore 39 through the shallow diaphragm 5. To prevent fretting at this point the shallow diaphragm is reinforced by a cylindrical collar 41. The end coil at the downstream end of the spring is a close fit in an annular recess 22 formed in the outlet member 26 concentrically about the flow passage therethrough. As a result of this arrangement the coil spring can neither be displaced sideways nor rotated. The coil at the upstream end of the coil spring is also located in a sideways direction y virtue of three pins 42 which are equiangularly spaced around the shallow diaphragm with the result that only one of these pins is visible in the section of FIG. 9.

The coil spring 8 biases the shallow diaphragm in its rest position against three abutment pins 43 which are again equiangularly spaced on a common pitch circle about the axis of the housing 1. The three abutment pins 43 are simple shouldered pins which are press-fitted into the end face of the inlet member 17. The use of shouldered pins enables the lengths of the portions of the pins which project into the flow chamber 38 to be accurately controlled so that the shallow diaphragm sits in its rest position parallel to the end face of the inlet member 17.

Three corresponding shouldered abutment pins 44 are provided in the outlet member 26 on the other side of the diaphragm and restrict the length of travel of the diaphragm in the downstream direction.

It will be appreciated that the monitor can be readily adapted to suit any desired flow conditions by varying the length of the shouldered pins 43, by varying the length of the shouldered pins 44, by varying the spring constant of the spring 8 and by displacing the evaluation device axially along the housing. The use of shouldered pins 44 prevents the coil spring binding which, when using a diaphragm without a central aperture, would result in the flow cross-section of the duct being blocked. The arrangement as shown also means that the inlet and outlet members 17 and 26, which can be provided with screw-threaded, welded, pinned or other connections as required, can be made identical and interchangeable thus reduced manufacturing costs.

Finally it is worthy of note that the magnet used in the embodiment of FIG. 9 is a simple hollow cylindrical magnet 45 which is secured to the shallow diaphragm 5 by a screw threaded fastener 46. The shallow diaphragm 5 is of course located by the coil spring 8 in such a way that it cannot rotate to any significant degree about the axis of the housing so that the permanent magnet 45 will always remained aligned in the desired manner with the switching device 25. The switching device 25 is preferably constructed in the same manner as already discussed in connection with the earlier embodiments and may be spaced in all embodiments from the housing by a small air gap if its performance could be expected to be deleteriously affected by the temperature of the medium flowing through the housing. A small air gap is perfectly satisfactory for this purpose because the convection currents set up in the air surrounding the housing can be expected to produce adequate cooling of the switching device. This cooling effect is particularly pronounced if the switching device is positioned horizontally alongside the housing.

When designing a through-flow monitor in accordance with the present invention it is advisable to make the stiffness of the spring as large as possible in order to avoid the diaphragm hanging downwardly under its own weight which could be disadvantageous when the housing is installed horizontally. The stiffness of the spring is increased when using an embodiment of the type shown in FIG. 9 because the increased area of the diaphragm means that a larger force acts on the diaphragm for a given flow and thus that a stronger spring is required.

It will be appreciated that all the described embodiments are of particularly simple construction and offer a high degree of operational reliability. Furthermore the illustrated and claimed designs result in a minimal hysteresis between the switching in and switching out points and can be used for an extremely wide range of applications.

I claim:

1. A through-flow monitor for a fluid, the monitor comprising a housing having inlet and outlet ends and therebetween an inner chamber bounded by a cylindrical wall of constant diameter; connecting means at each of said inlet and outlet ends for connecting said housing into a flow duct for the fluid, with the cross-sectional area of said inner chamber being substantially larger than that of said flow duct; a shallow diaphragm having a peripheral edge with a diameter almost as large as that of said cylindrical wall concentrically disposed within said inner chamber, wherein said peripheral edge cooperates with said cylindrical wall to define a narrow annular gap for the flow of fluid past said shallow diaphragm and wherein said shallow diaphragm is movable under the force of fluid flow from a rest position to an operative position; first abutment means within said chamber defining said rest position; a coil spring disposed concentrically within said inner chamber, said coil spring having first and second ends one of which is secured to said housing and the other of which is fastened to said shallow diaphragm to carry and guide the same within said inner chamber, wherein said coil spring biases said shallow diaphragm towards said first abutment means; and means for detecting the presence of said shallow diaphragm when in said operative position.

2. A through-flow monitor in accordance with claim 1 and wherein the ratio of the diameter of said cylindrical wall to the diameter of the flow duct lies in the range from 1.5 to 10.

3. A through-flow monitor in accordance with claim 1 wherein the radial width of said annular gap is selected in the range from 1 to 6 mm in dependence on the throughput.

4. A through-flow monitor in accordance with claim 1 and wherein the thickness of said shallow diaphragm is less than 0.05 times its diameter.

5. A through-flow monitor in accordance with claim 1 and wherein said coil spring is a compression coil spring.

6. A through-flow monitor in accordance with claim 5 and wherein said compression coil spring has a diameter to length ratio, with the shallow diaphragm in said rest position, in the range from 0.6 to 8.5.

7. A through-flow monitor in accordance with claim 1 and wherein said means for detecting the presence of said shallow diaphragm in said operative position comprises a magnetic field sensitive detector mounted on an outside of said housing for detecting a magnetic field associated with said shallow diaphragm.

8. A through-flow monitor in accordance with claim 7 and wherein said magnetic field associated with said diaphragm is generated by at least one permanent magnetic element carried by said shallow diaphragm.

9. A through-flow monitor in accordance with claim 7 and wherein said magnetic field sensitive detector is mounted on said housing with an air gap therebetween.

10. A through-flow monitor in accordance with claim 7 and wherein said magnetic field sensitive detector is adjustably movable along said housing.

11. A through-flow monitor in accordance with claim 1 and wherein second abutment means is provided on said housing on the other side of said shallow diaphragm from said first abutment means whereby to limit the maximum displacement of said shallow diaphragm.

12. A through-flow monitor in accordance with claim 11 wherein said coil spring is a compression coil spring and said second abutment means are sized to prevent coil binding of said coil spring blocking the flow path through said monitor.

13. A through-flow monitor in accordance with claim 11 and wherein said first and second abutment means comprise abutment pins directed axially of said housing and engaging in respective connecting means at each of said inlet and outlet ends.

14. A through-flow monitor in accordance with claim 13 wherein three substantially equally spaced abutment pins are provided on each side of said shallow diaphragm.

15. A through-flow monitor in accordance with claim 13 wherein said abutment pins are interchangeable, shouldered abutment pins press-fitted into respective inlet and outlet members of said housing.

16. A through-flow monitor in accordance with claim 12 and wherein said connection means at each of said inlet and outlet ends comprise respective inlet and outlet members, with each of said inlet and outlet members being of circular shape and being fitted within a cylindrical sleeve to complete said housing.

17. A through-flow monitor in accordance with claim 16 wherein respective O-ring seals are provided around said inlet and outlet members, between said inlet and outlet members and said cylindrical sleeve.

18. A through-flow monitor in accordance with claim 17 and wherein substantially radially directed securing screws are provided to secure said inlet and outlet members to said cylindrical sleeve, with said radially directed screws being positioned axially outside of said O-rings.

* * * * *